US012561692B2

(12) United States Patent  
Lok et al.

(10) Patent No.: US 12,561,692 B2  
(45) Date of Patent: Feb. 24, 2026

(54) UPDATING ACCOUNT INFORMATION USING VIRTUAL IDENTIFICATION

(71) Applicant: Wells Fargo Bank, N.A., San Francisco, CA (US)

(72) Inventors: Robin H. Lok, Piedmont, CA (US); Caroline A. Machado, Mountain View, CA (US); Tiffany N. Twilley, Tiburon, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/678,519

(22) Filed: May 30, 2024

(65) Prior Publication Data

US 2025/0371550 A1     Dec. 4, 2025

(51) Int. Cl.  
*G06Q 30/01*          (2023.01)

(52) U.S. Cl.  
CPC .................................... *G06Q 30/01* (2013.01)

(58) Field of Classification Search  
USPC ......................................................... 705/304  
See application file for complete search history.

(56) References Cited

U.S. PATENT DOCUMENTS

| | | | |
|---|---|---|---|
| 11,432,149 B1* | 8/2022 | Dhanoa ................... | G06F 21/36 |
| 2014/0066044 A1* | 3/2014 | Ramnani ............... | H04L 67/306 |
| | | | 455/418 |
| 2022/0198451 A1* | 6/2022 | Alterman ............... | G06Q 20/40 |
| 2022/0391482 A1* | 12/2022 | Villanueva Gaviola ..................... | |
| | | | G06F 3/0482 |

OTHER PUBLICATIONS

A. E. Al-Chalabi, S. Essa, H. Shahzad and I. Damaj, "A wearable and ubiquitous NFC wallet," 2015 IEEE 28th Canadian Conference on Electrical and Computer Engineering (CCECE), Halifax, NS, Canada, 2015, pp. 152-157, doi: 10.1109/CCECE.2015.7129177. (Year: 2015).*

* cited by examiner

*Primary Examiner* — Dione N. Simpson  
(74) *Attorney, Agent, or Firm* — Merchant & Gould P.C.

(57)          ABSTRACT

An example computer system for updating user account information can include: one or more processors; and non-transitory computer-readable storage media encoding instructions which, when executed by the one or more processors, causes the computer system to: receive a virtual identification (ID), the virtual ID including user information; store the virtual ID within a smart wallet; connect one or more user accounts to the smart wallet; compare the user information of the virtual ID with second user information of the one or more user accounts; determine if the user information and the second user information are different; and update the one or more user accounts by replacing the second user information with the user information.

14 Claims, 6 Drawing Sheets

500

Receive a Virtual ID by a Smart Wallet — 510

Connect the Smart Wallet to a User Account — 512

Compare the User Account Information to the Virtual ID — 514

Determine if the User Account Information is Different — 516

Update the User Account Information Using the Virtual ID — 518

UPDATING ACCOUNT INFORMATION USING VIRTUAL IDENTIFICATION

BACKGROUND

User-specific information may change over time. For example, a user may move and change his/her residential address, legally change his/her first or last name, open and/or close new payment accounts, etc. The occurrence of such changes can be a significant annoyance for the user because it requires the user to individually update her user account information in many distinct places and services. In addition to being repetitive and time-consuming, in some instances users may forget to update a particular user account, which may cause further user account issues.

SUMMARY

Examples provided herein are directed to updating account information using virtual identification.

According to one aspect, a computer system for updating user account information can include: one or more processors; and non-transitory computer-readable storage media encoding instructions which, when executed by the one or more processors, causes the computer system to: receive a virtual identification (ID), the virtual ID including user information; store the virtual ID within a smart wallet; connect one or more user accounts to the smart wallet; compare the user information of the virtual ID with second user information of the one or more user accounts; determine if the user information and the second user information are different; and update the one or more user accounts by replacing the second user information with the user information.

According to another aspect, a method for updating user account information, can include: receiving a virtual identification (ID), the virtual ID including user information; storing the virtual ID within a smart wallet; connecting one or more user accounts to the smart wallet; comparing the user information of the virtual ID with second user information of the one or more user accounts; determining if the user information and the second user information are different; and updating the one or more user accounts by replacing the second user information with the user information.

The details of one or more techniques are set forth in the accompanying drawings and the description below. Other features, objects, and advantages of these techniques will be apparent from the description, drawings, and claims.

DETAILED DESCRIPTION

This disclosure relates to utilizing a virtual identification (ID) to update user accounts. For example, the virtual ID may be a mobile driver's license. As more services are offered digitally, users have begun to migrate traditional services, such as a wallet with credit cards, to digital systems. These digital systems may be stored and executed on their smartphones or other computing devices. In addition, driver's licenses can be offered in a digital format, such as a mobile driver's license. Other virtual IDs may be offered as well. Storing these items in a digital format helps combat loss and theft. For example, a user may lose or have stolen their credit cards and/or driver's license. Keeping these items in a smart wallet stores them in the cloud where they cannot be made unavailable so easily.

Smart wallets offer many features of a traditional wallet but in a digital format. Credit cards, IDs, e-tickets, coupons, user accounts, and other digital items can be stored in the smart wallet. Further, the smart wallet includes functionality to use communication features of an associated device to communicate with other devices to access the stored items. For example, a user can place a device with a smart wallet that includes a credit card near a payment device to pay for items. User accounts can also be associated with the smart wallet.

Virtual IDs can also be stored in the smart wallet. There can be many types of virtual IDs that store information about the user. One example of such a virtual ID is a mobile driver's license. The mobile driver's license can store information traditionally provided on the user's physical driver's license, such as the user's permanent physical address. The address from the virtual ID may have been recently updated. Accordingly, the virtual ID has a more recent address than is listed in accounts of the user. A computing device associated with the user can compare user information of other associated accounts with the smart wallet to the virtual ID to verify if the user account information of the other accounts needs to be updated. In some embodiments, the server sends a notification to a user's device to request if the user information of the associated accounts should be updated to match the user information of the virtual ID.

Figure 1:
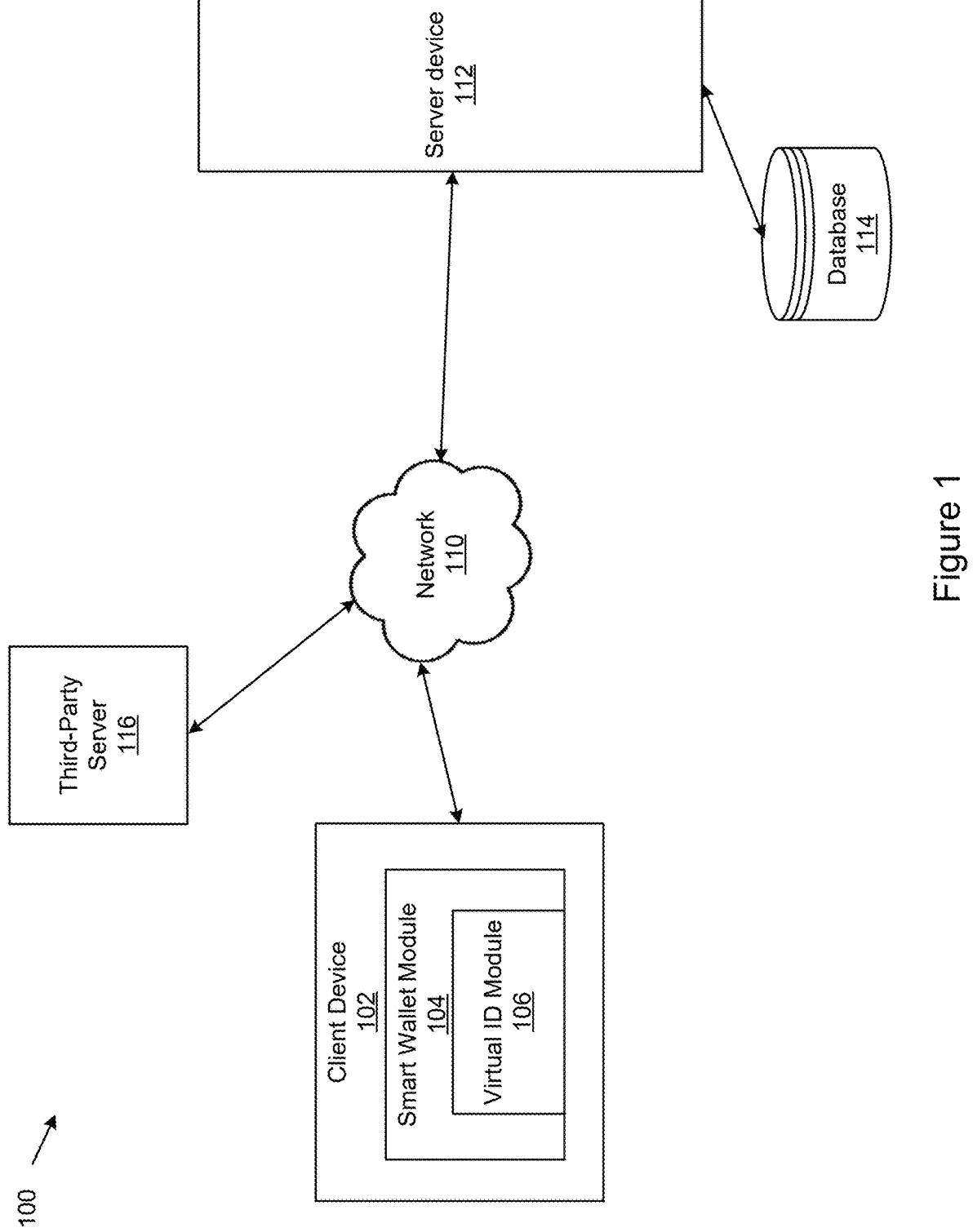
FIG. 1 schematically shows aspects of one example system programmed to update user accounts.

FIG. 1 schematically shows aspects of one example system 100 programmed to update user account information using a virtual ID. The system 100 can be a computing environment that includes a plurality of client and server devices. In this instance, the system 100 includes a client device 102, a server device 112, a database 114, and a third-party server 116. The client device 102 includes a smart wallet module 104, which also has stored within it a virtual ID module 106 and a third-party client module 108. The client device 102, the server device 112, and the third-party server connect through a network 110.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client device 102 can be programmed to communicate with the server device 112 to perform various tasks, such as financial transactions. Many other configurations are possible, and the disclosure is not limited to the financial industry. In other embodiments, the server device 112 provides other user services.

The example client device 102 is configured to provide services to a user. For example, the client device 102 may provide a user interface to receive inputs and interact with the server device 112. In some embodiments, the client device 102 is configured to provide notifications or pop-ups. The notifications display on the client device 102, and the client device 102 may allow interactions such as selecting the notification. Selecting the notification may update user information or redirect the user to a specific application or website.

In this embodiment, the client device 102 includes the smart wallet module 104. The smart wallet module 104 is configured to store virtual representations of items. These items may normally be stored in a physical wallet. For example, smart wallet module 104 may store virtual representations of credit cards. Further, the virtual representations can include the credit card information (e.g., card number, security code, name, address, etc.) associated with the physical card. In some embodiments, these virtual representations have generated tokens associated with the virtual representations. The tokens can then be provided to a payment system instead of the credit card's information.

The smart wallet module 104 stores digital items associated with the user of the client device 102. Further, the smart wallet is configured to store virtual representations of physical payment cards and other items found in a wallet. Further, the smart wallet module 104 is configured to communicate with the server device 112. For example, the server device 112 may manage the smart wallet module 104. In some embodiments, the smart wallet module 104 sends stored virtual representations of payment cards to the server device 112 for storage in the cloud. In some embodiments, the smart wallet module 104 is configured to use near field communications (NFC) to communicate with a nearby payment system. The smart wallet module 104 uses a selected virtual payment card to send payment for a goods or services.

In some embodiments, the smart wallet module 104 can be managed by an entity such as a financial institution. The entity managing the smart wallet module 104 can include encryptions of user data and associated login information. In some embodiments, the smart wallet module 104 links to additional service provider accounts. For example, the server device 112 may manage the smart wallet module 104 as an application that is executed on the client device 102.

The smart wallet module 104 also stores a virtual ID module 106. The virtual ID module 106 stores identification information of the user. In some embodiments, the virtual ID module 106 stores a mobile driver's license associated with the user of the client device 102. The mobile driver's license can include various information about the user. This information can include a permanent physical address, driver's license number, date of birth, and other associated information. Further, the information may be information submitted to the government for official identification purposes. Accordingly, an address listed in the mobile driver's license may be more accurate on account of the official nature of a driver's license. In some embodiments, the virtual ID information associated with the virtual ID module 106 is stored in a remote database, such as the database 114. For example, the server device 112 encrypts the information associated with the virtual ID module 106, associates the information with a user account, and stores the virtual ID information. Such information is then accessible by the virtual ID module 106 of the client device 102.

In addition, the virtual ID module 106 may receive virtual ID information in a variety of formats. In some embodiments, the virtual ID information is received from a government server. For example, the state department of transportation (DOT) may maintain a database with all mobile driver's license for residents of the state. The government server can then be accessed by the client device 102 to download the virtual ID to the virtual ID module 106. In some embodiments, the virtual ID information may also be stored in the database 114 by the server device 112. In other embodiments, the client device 102 includes a camera that captures an image of a user's physical driver's license. The image is then scanned to obtain the user's information associated with the physical driver's license. A mobile driver's license is then created and stored as the virtual ID module 106.

In the shown embodiment, the database 114 stores data for use by the server device 112. In some embodiments, the database 114 stores user account data for the entity that manages the server device 112. For example, the financial institution may manage the server device 112 and users with accounts of the financial institution have their account information stored in the database 114. In some embodiments, data associated with the user's virtual ID is stored in the database 114. Storing this data in the database 114 enables multiple devices of a user to access the virtual ID. In addition, the data within the database 114 is encrypted to securely store the data.

The system 100 also includes the third-party server 116. The third-party server 116 manages user accounts that may be connected to the smart wallet module 104. In some embodiments, the third-party server 116 offers a payment card service that is stored in the smart wallet module 104. When the client device 102 communicates with the payment system to make a transaction using the associated third-party payment card, the smart wallet module 104 communicates with the third-party server 116 to complete the transaction. In some embodiments, this includes sending a token to the third-party server 116 to validate the transaction. In some embodiments, the third-party server stores user account information such as a billing address. The third-party server 116 can receive requests to update user account information from the server device 112 or the client device 102. In other embodiments, the third-party server 116 hosts a retail website. The user may have account associated with the retail website. In addition, the smart wallet module 104 connects to the user account to pay for items on the retail website of the third-party server 116.

Figure 2:
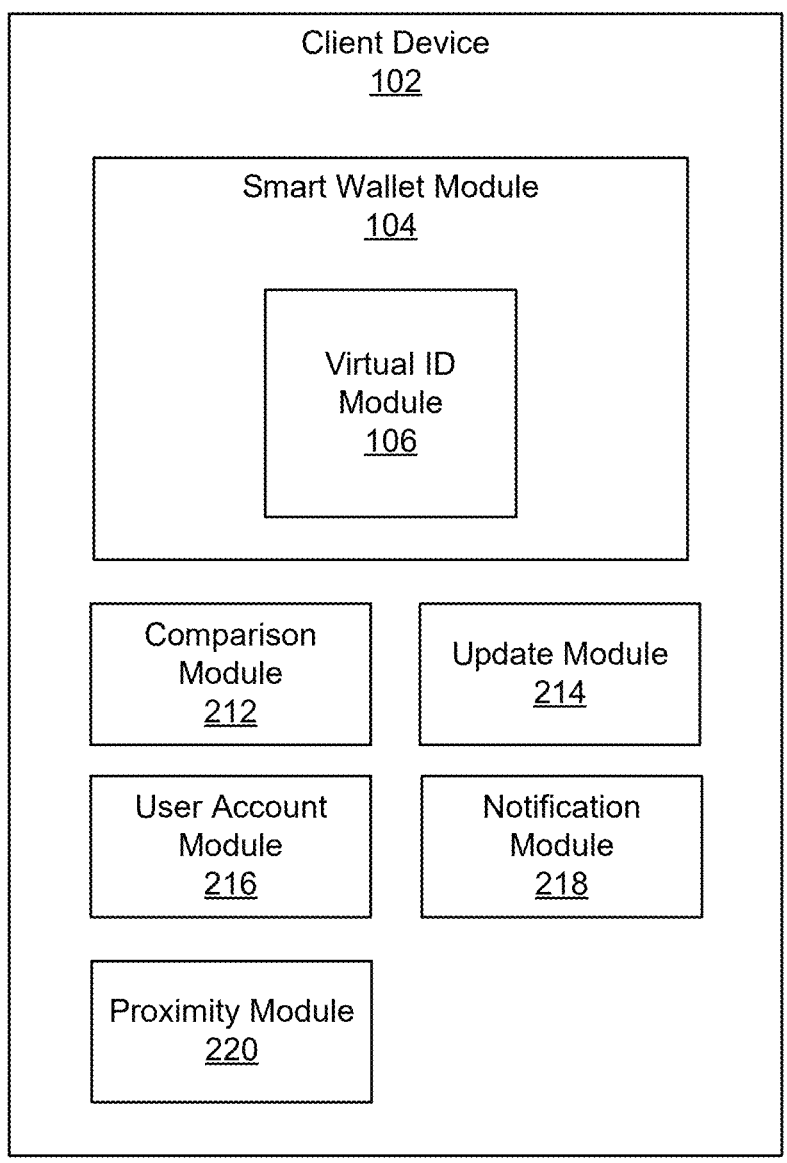
FIG. 2 shows example logical components of a client device of the system of FIG. 1.

Referring now to FIG. 2, the client device 102 is shown in more detail. The client device 102 includes the smart wallet module 104, a comparison module 212, an update module 214, a user account module 216, a notification module 218, and a proximity module 220. The smart wallet module 104 also includes the virtual ID module 106.

The user account module 216 includes user accounts associated with the user. For example, a user's social media account is connected to the user account module 216. In other examples, many other types of accounts can be managed by the user account module 216. For instance, user accounts like social media accounts, financial accounts, online shopping accounts, and/or streaming accounts can be managed by the user account module 216.

In these examples, the user account module 216 can store various information about the accounts. This can include information about the user credentials, such as username and password. The information can also include bibliographic information about the user that is associated with each account, such as the user's name, address, telephone number, etc.

Further, the user account module 216 links to the smart wallet module 104. User accounts of the user account module 216 that are linked to the smart wallet module 104 may expose stored user information to the smart wallet module 104, such as user accounts that don't include sensitive user information. Alternatively, the user account module 216 may only expose a portion of the relevant user information.

The smart wallet module 104 may be configured to request user information from the respective platforms of the accounts associated with the user account module 216, such as the third-party server 116, hosting those user accounts. This request may require the user to provide credentials associated with the user account module 216. In some embodiments, the credentials are associated with the virtual ID module 106. If the client device 102 authenticates the request, the smart wallet module 104 may receive the withheld user information currently associated with the user account module 216, and the smart wallet module 104 may be configured to store this user information only temporarily until comparisons are complete. The smart wallet module 104 may also be configured to delete the user information from an associated memory after comparison for security purposes.

In this embodiment, the comparison module 212 can review the user account information of the user account module 216. The comparison module 212 compares the user account information of the user account module 216 with the user information of the virtual ID module 106. The comparison module 212 identifies the user information values for relevant user information data fields (e.g., name, address, driver's license number, birth date, or the like) and compares these values to values from the virtual ID module 106 for the corresponding user information data fields. In some examples, the comparison module 212 may be configured to determine whether the differences between the values are significant. For example, a middle name value of "A." instead of "Anne" may not be significant because this is an abbreviation whereas a middle name value of "Ann" may be a significant difference because it reflects a misspelling.

If a significant difference is identified, the example update module 214 generates a request to update the user account module 216. This may include a request to the third-party server hosting that user account, such as the third-party server 116. The client device 102 may display a prompt to confirm an update to the user account using the notification module 218. In an instance in which the user confirms the update, the update module 214 may provide an update request to the third-party server 116 that includes the updated user information. In some embodiments, server device 112 provides the update. This may require the user to provide user account credentials of the user account module 216 for the third-party server 116. In some embodiments, a secure session has already been established between the client device 102 and the third-party service associated with the user account module 216. Thus, the credentials are not needed.

Alternatively, the update module 214 may simply push updated user information and/or indication of the virtual ID module 106 (e.g., a digital token of the virtual ID, select data of the virtual ID, or the like) to the third-party server 116 to cause the third-party server 116 to perform the comparison and/or update using its own services. In some embodiments, the comparison module 212 compares the user account information of the virtual ID with its own record of user account information. If there are any discrepancies, the update module 214 updates the stored user account information with the virtual ID 106 user information.

The example notification module 218 of the client device 102 manages notifications displayed or otherwise output on the client device 102. A notification provided by the notification module 218 can alert the user to a status of an application or the notification indicates that the application requires feedback. For example, the smart wallet module 104 may use the notification module 218 to request input indicating whether user accounts associated with the smart wallet module 104 should be updated using the information in the virtual ID module 106. Once the input is received, the notification module may also provide a message indicating that the user accounts have been updated.

In some embodiments, the smart wallet module 104 may automatically push an update to an entity device that is within a predefined close proximity of the user device. In some embodiments, the proximity module 220 determines if the client device 102 is within a predetermined threshold of distance to the entity device. For instance, the proximity module 220 may automatically detect when the user is physically at the location of an entity, such as by using geolocation data or via communications (e.g., Bluetooth, NFC, Wi-Fi) with a respective entity device. The smart wallet module 104 may then determine whether the user has an associated user account with that particular entity and, if so, may push updated user information and/or indication of the virtual ID module 106 (e.g., a digital token of the virtual ID, select data of the virtual ID, or the like) to the entity device so the entity device can perform the comparison and/or update on their end. In some embodiments, the user account information of the entity device is compared by the comparison module 212. Responsive to determining the user account information of the entity is out of date, the proximity module 220 sends a request to the entity device to update the account information with the user information found in the virtual ID module 106. In some embodiments, the proximity module 220 sends the update request to an entity server associated with the entity device.

Figure 3:
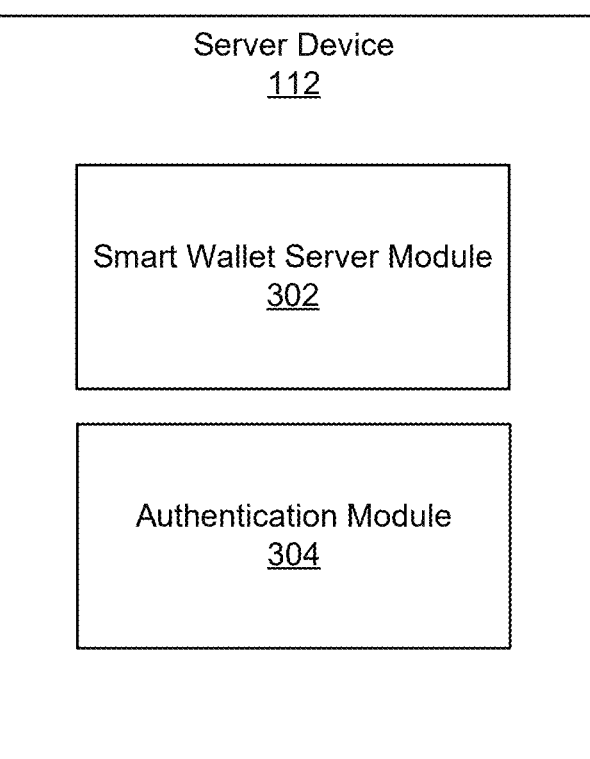
FIG. 3 shows example logical components of a server device of the system of FIG. 1.
Figure 4:
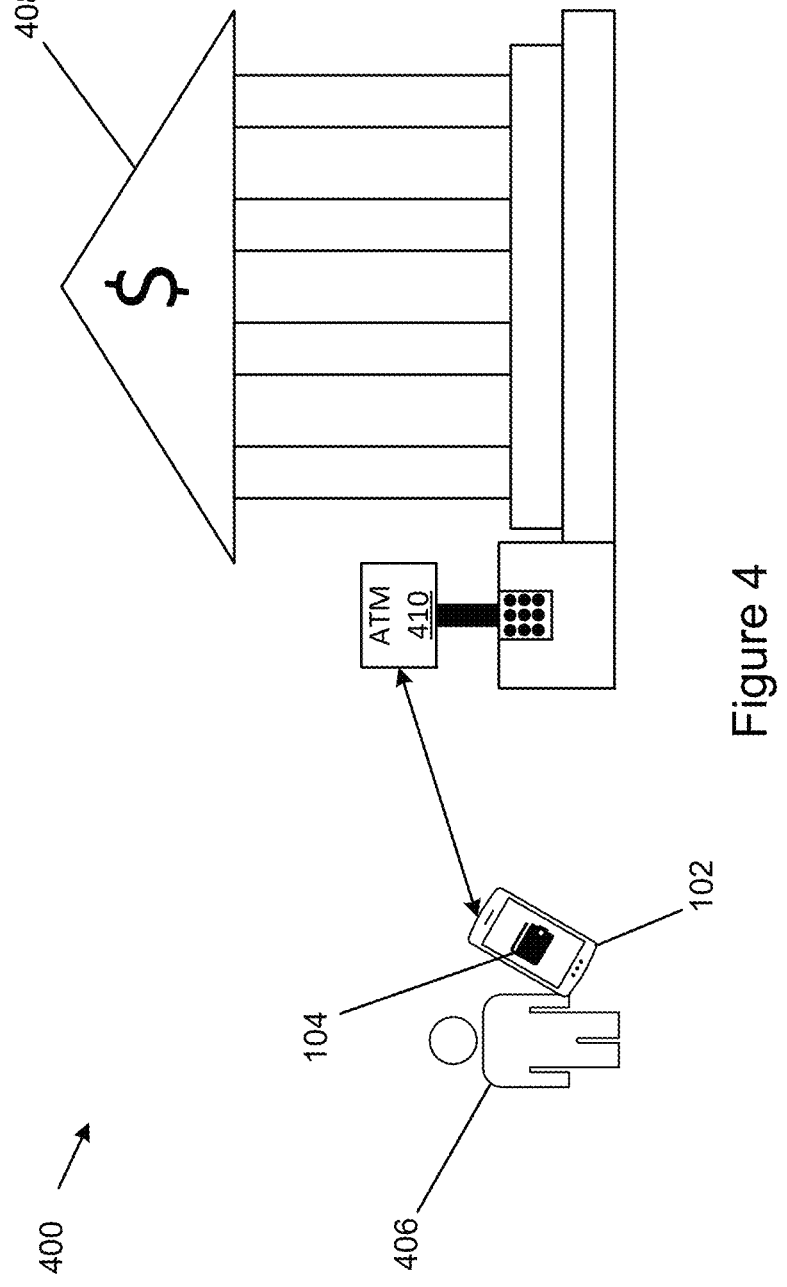
FIG. 4 shows the example system of FIG. 1 in an example environment for updating an account with a financial institution.

Referring now to FIG. 3, example components of the server device 112 are shown. In the shown embodiment, the server device 112 includes a smart wallet server module 302 and an authentication module 304. In some embodiments, the server device 112 includes a comparison module 306, and an update module 308.

The smart wallet server module 202 of the server device 112 communicates with the smart wallet module 104 of the client device 102. In some embodiments, the smart wallet server module 202 stores data so it can be accessed from multiple devices. Accordingly, the smart wallet server module 202 maintains the "cloud" infrastructure for operating a smart wallet.

In some embodiments, the smart wallet server module 302 stores data associated with the smart wallet module 104. For example, the smart wallet server module 302 stores physical credit card information in the form of virtual credit card data for access by any device with the proper credentials including the client device 102. Additional virtual representations may be stored as well. For example, virtual ID data associated with the virtual ID module 106 can also be stored and retrieved by the smart wallet server module 302. In some embodiments, the smart wallet server module 302 encrypts the data that it stores. The smart wallet server module 302, thus, enables cloud functionality of the smart wallet module 104. Other client devices can access the smart wallet server module 302 to initialize a smart wallet module with the same user account information and virtual cards as the smart wallet module 104.

Further, the smart wallet server module 302 can manage payment data associated with a virtual card stored within the smart wallet. For example, a user may use a stored virtual payment card within the smart wallet to pay at a vendor. The smart wallet module 104 generates a token that is passed to the payment system of a vendor. The payment system then sends the token to the server device 112. The smart wallet server module 302 then uses the token to access stored data associated with the payment card. Then, the smart wallet server module 302 initiates a payment transaction using the card information associated with the token. In some embodiments, the smart wallet server module 302 manages stored virtual payment cards associated with third party services.

In some embodiments, the smart wallet server module 302 also stores preferences for data sharing. For example, the client device 102 may receive input indicating that address data from the virtual ID module 106 can be shared with third parties. The smart wallet server module 302 receives the preferences from the smart wallet module 104 and stores the preferences as data. In some embodiments, the smart wallet server module 302 allows other applications and services to access stored virtual ID module 106 address data based on the stored preference data.

The example authentication module 304 of the server device 112 is programmed to authenticate the user of the smart wallet module 104. For example, the client device 102 may request access to the smart wallet module 104. The authentication module 304 authenticates that the requesting device has permission to access the smart wallet module 104. In some embodiments, the authentication module 304 requests a password associated with the smart wallet module 104. In other embodiments, the authentication module 304 requests a passkey from the client device 102. For example, the authentication module 304 may send a notification requesting the user to authenticate themselves before the server device 112 provides access to the smart wallet module 104 to the client device 102. The user may authenticate themselves through a passkey, such as matching their fingerprint or face unlock, through using a password, or through using a PIN.

In alternative embodiments, the server device 112 can also include additional functionality, including functionality described herein as being performed by the client device 102. For instance, the server device 112 can include one or more of the functionalities provided above performed by the comparison module 212 and the update module 214 of the client device 102.

Referring now to FIG. 3, the example environment includes the client device 102 connecting to the entity device 410. In addition, the user 406 has the client device 102. The entity device 410 is associated with an entity 408.

In this embodiment, the entity 408 is a bank with an entity device 410, which is an automatic teller machine (ATM). The user 406 has a payment account at the entity 408. The client device 102 includes the smart wallet module 104 with a stored virtual ID. The virtual ID has updated user account information. Once the user 406 moves within a predetermined threshold of distance to the entity device 410, the client device 102 connects to the entity device 410. The client device 102 determines that the user 406 has an account associated with the entity 408. Responsive to determining the user account information of the entity is outdated, updated information from the virtual ID module 106 stored in the smart wallet module 104 is used to update the user account associated with the entity 408.

In some embodiments, the client device 102 connects to the server device 112. Responsive to connecting to the entity device 410, the client device 102 compares the user account information associated with the entity 408 and the virtual ID module 106. After the comparison, the user account of the entity 408 is updated using the user information of the virtual ID module 106. In some embodiments, the client device 102 updates the user account information of the entity 408 while in others the server device 112 updates the user account of the entity 408. In some embodiments, the entity 408 is a retail institution and the entity device is a retail point-of-sale (POS) device.

Figure 5:
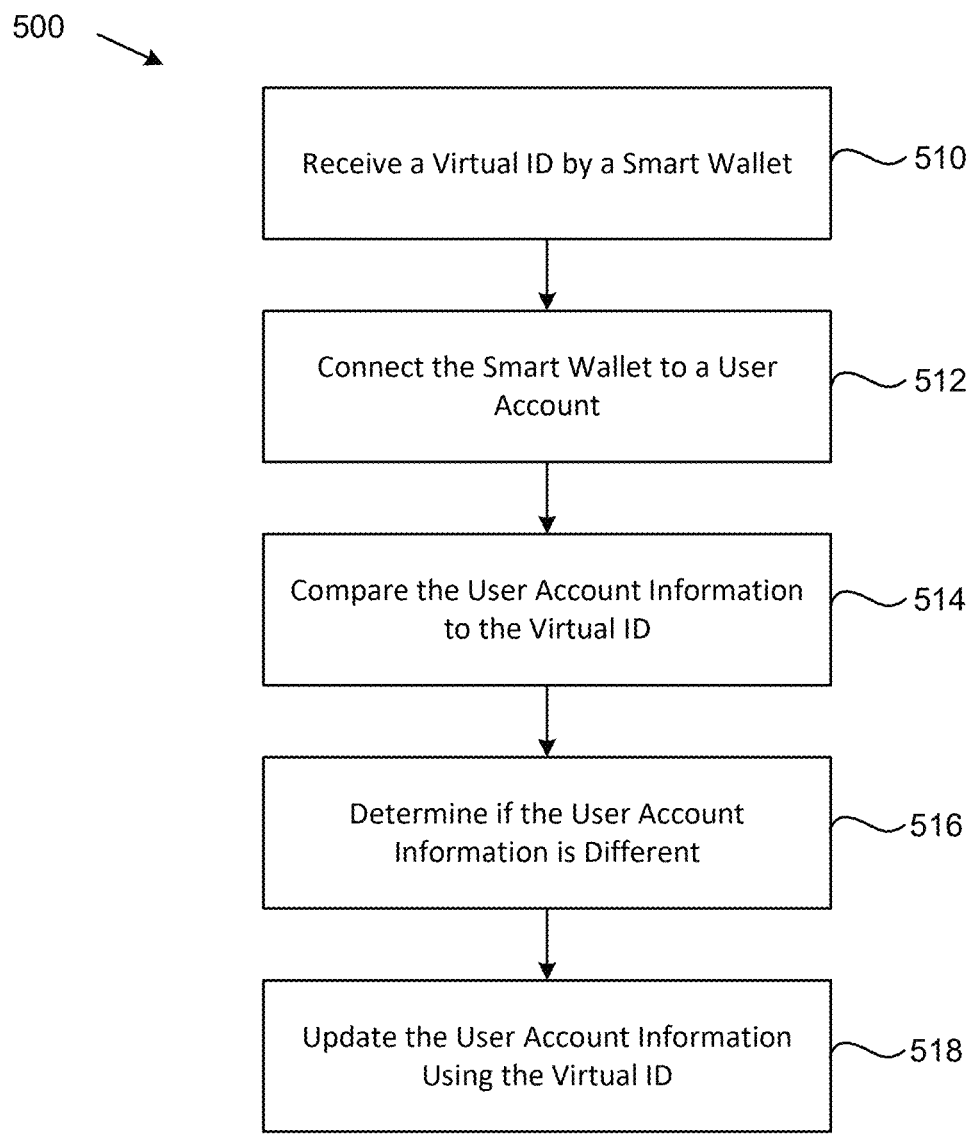
FIG. 5 shows an example method for updating a user account using the client device of FIG. 1.

Referring now to FIG. 5, the method 500 includes operations 510-518 for updating an example user account using a virtual ID. At operation 510, an example smart wallet of a user device receives an example virtual ID. The virtual ID is a mobile driver's license that includes user information such as the user's name and address. In this example, the user's name is John Doe, and the address is 123 Main Street. The user recently moved, and the physical driver's license, and consequently the virtual ID, has the user's most recent address.

The smart wallet receives the virtual ID by the user taking a picture of a physical driver's license. Next, the smart wallet connects to an example user account at operation 512. The user account is a retail website (e.g., Amazon.com). The user account of the retail website has an associated user's address for shipping bought items. Here, the address of the user account is outdated since the user has not updated the address yet since the move. In this example, the address is 456 Union Avenue. At operation 514, the user account information is compared with the information of the virtual ID. Accordingly, the 123 Main Street is compared against the 456 Union Avenue. The smart wallet determines if the user account information is different from the information of the virtual ID at operation 516. Operation 516 may include comparing values of the information of the virtual ID and the information of the user account. Then, the address of the user account of the retail website is updated using the address from the virtual ID at operation 518. Accordingly, the 456 Union Avenue is changed to 123 Main Street. When a user orders an item from the retail website, the item now goes to the 123 Main Street address where the user currently resides instead of the outdated address.

In some embodiments, the user device pushes the update to a server hosting the retail website and the user account. Other embodiments include displaying a notification on the user device that requests input from the user indicating if the user account should be updated. In some embodiments, user account credentials are provided to the smart wallet to enable the smart wallet to access the user account and update the address. For example, the user provides a password for the user account of the retail website.

Figure 6:
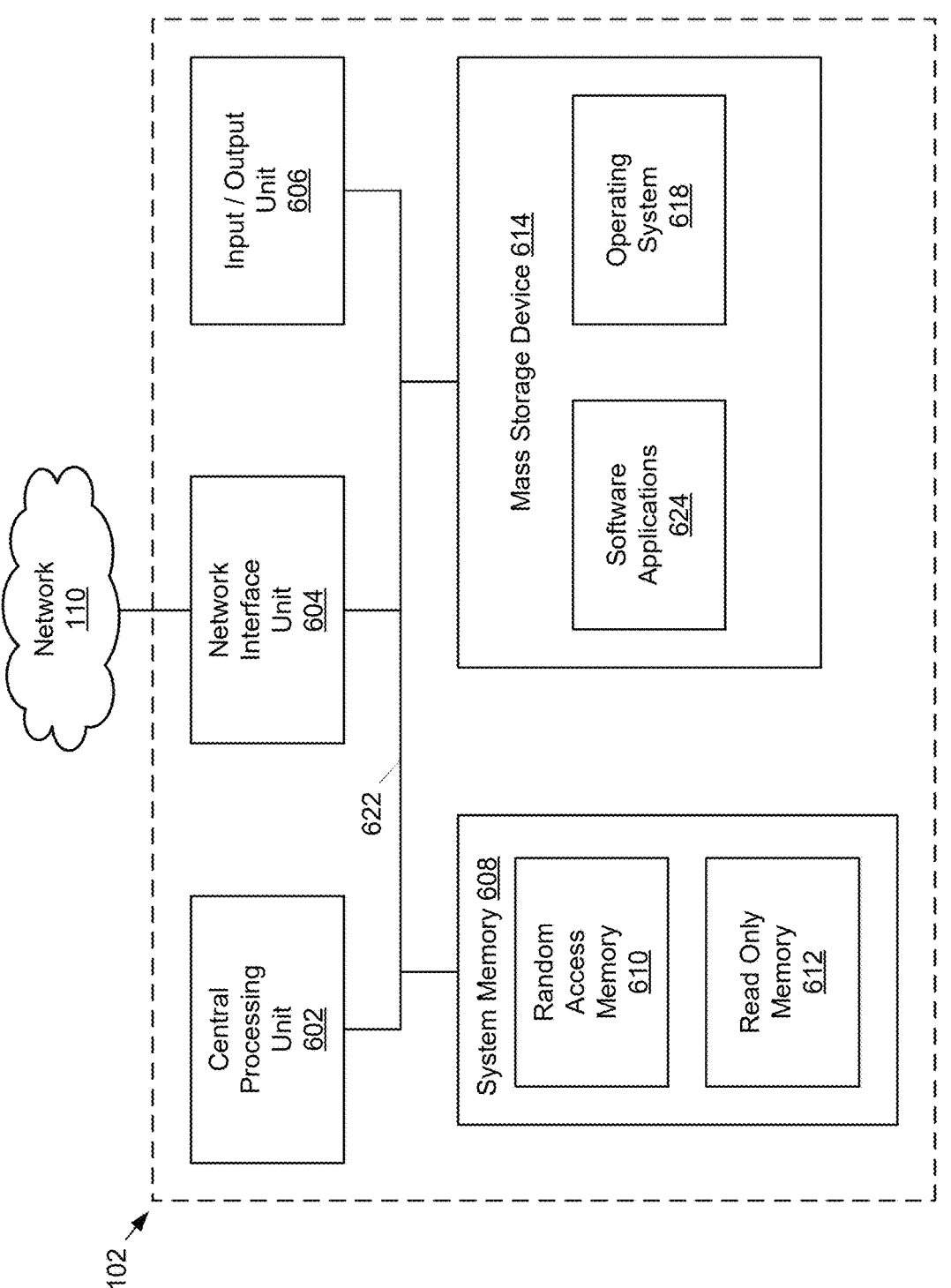
FIG. 6 shows example physical components of the client device of FIG. 2.

As illustrated in the embodiment of FIG. 6, the example client device 102 which provides the functionality described herein, can include at least one central processing unit ("CPU") 602, a system memory 608, and a system bus 622 that couples the system memory 608 to the CPU 602. The system memory 608 includes a random-access memory ("RAM") 610 and a read-only memory ("ROM") 612. A basic input/output system containing the basic routines that help transfer information between elements within the client device 102, such as during startup, is stored in the ROM 612. The client device 102 further includes a mass storage device 614. The mass storage device 614 can store software instructions and data. A central processing unit, system memory, and mass storage device similar to that shown can also be included in the other computing devices disclosed herein.

The mass storage device 614 is connected to the CPU 602 through a mass storage controller (not shown) connected to the system bus 622. The mass storage device 614 and its associated computer-readable data storage media provide non-volatile, non-transitory storage for the client device 102. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instruc- tions, data structures, program modules, or other data. Example types of computer-readable data storage media include, but are not limited to, RAM, ROM, EPROM, EEPROM, flash memory or other solid-state memory tech- nology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the client device 102.

According to various embodiments of the invention, the client device 102 may operate in a networked environment using logical connections to remote network devices through network 110, such as a wireless network, the Internet, or another type of network. The client device 102 may connect to network 110 through a network interface unit 604 con- nected to the system bus 622. It should be appreciated that the network interface unit 604 may also be utilized to connect to other types of networks and remote computing systems. The client device 102 also includes an input/output controller 606 for receiving and processing input from a number of other devices, including a touch user interface display screen or another type of input device. Similarly, the input/output controller 606 may provide output to a touch user interface display screen or other output devices.

As mentioned briefly above, the mass storage device 614 and the RAM 610 of the client device 102 can store software instructions and data. The software instructions include an operating system 618 suitable for controlling the operation of the client device 102. The mass storage device 614 and/or the RAM 610 also store software instructions and applica- tions 624, that when executed by the CPU 602, cause the client device 102 to provide the functionality of the client device 102 discussed in this document.

While the discussed components and functions are dis- cussed in association with the client device 102, some or all of the components and functions may be performed by the server device 112 or another device.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for updating user account informa- tion, the computer system comprising:
   one or more processors; and
   non-transitory computer-readable storage media encoding instructions which, when executed by the one or more processors, cause the computer system to:
   receive, upon request by the computer system from a government server, a virtual identification (ID) com- prising a mobile driver's license, the virtual ID including user information including name and address;

store, by the computer system using encryption, the virtual ID within a smart wallet;
   connect one or more user accounts to the smart wallet;
   compare, by the computer system, the user information of the virtual ID with second user information of the one or more user accounts;
   determine if the user information and the second user information are different;
   update the one or more user accounts by replacing the second user information with the user information including the name and address from the mobile driver's license;
   determine, by the computer system using a proximity- based module, that the computer system is within a predetermined distance of an entity device associ- ated with at least one of the one or more user accounts; and
   responsive to a determination that the computer system is within the predetermined distance:
   connect to the entity device; and
   automatically push, via a secure token, an update of third user information of the at least one of the one or more user accounts to enable the entity device to perform comparison of account information on an entity server associated with the entity device with the name and address from the mobile driv- er's license.

2. The computer system of claim 1, wherein the instruc- tions further cause the computer system to, responsive to a determination that the user information and the second user information are different:
   provide a notification requesting input to update the second user information with the user information; and
   receive input indicating update the second user informa- tion.

3. The computer system of claim 1, wherein to receive the virtual ID includes to:
   capture a photo of a physical ID; and
   scan the photo for the user information.

4. The computer system of claim 1, wherein to compare the user information with the second user information includes to:
   identify values of the second user information; and
   compare the values of the second user information to values of the virtual ID.

5. The computer system of claim 4, wherein the second user information is not updated if the values of the second user information are shortened versions of the values of the virtual ID.

6. The computer system of claim 1, wherein the one or more user accounts are associated with a retail website, a social media website, or a payment card.

7. The computer system of claim 1, wherein the instruc- tions further cause the computer system to request verifica- tion that the user information can be used to update the one or more user accounts.

8. A method for updating user account information, the method comprising:
   receiving, upon request by a computer system from a government server, a virtual identification (ID) com- prising a mobile driver's license, the virtual ID includ- ing user information including name and address;
   storing, by the computer system using encryption, the virtual ID within a smart wallet;
   connecting one or more user accounts to the smart wallet;

comparing, by the computer system, the user information of the virtual ID with second user information of one or more user accounts;

determining if the user information and the second user information are different;

updating the one or more user accounts by replacing the second user information with the user information including the name and address from the mobile driver's license;

determining, by the computer system using a proximity-based module, that the computer system is within a predetermined distance of an entity device associated with at least one of the one or more user accounts; and responsive to a determination that the computer system is within the predetermined distance:

connecting to the entity device; and automatically pushing, via a secure token, an update of third user information of the at least one of the one or more user accounts to enable the entity device to perform comparison of account information on an entity server associated with the entity device with the name and address from the mobile driver's license.

9. The method of claim 8, further comprising responsive to a determination that the user information and the second user information are different:

providing a notification requesting input to update the second user information with the user information; and receiving input indicating to update the second user information.

10. The method of claim 8, wherein receiving the virtual ID includes:

capturing a photo of a physical ID; and scanning the photo for the user information.

11. The method of claim 8, wherein comparing the user information with the second user information includes:

identifying values of the second user information; and comparing the values of the second user information to values of the virtual ID.

12. The method of claim 11, wherein the second user information is not updated if the values of the second user information are shortened versions of the values of the virtual ID.

13. The method of claim 8, wherein the one or more user accounts are associated with a retail website, a social media website, or a payment card.

14. The method of claim 8, further comprising:

requesting verification that the user information can be used to update the one or more user accounts.

* * * * *